Nov. 3, 1959 R. A. KUHNAU 2,911,119
PACKER UNIT FOR TRUCKS
Filed May 23, 1958 2 Sheets-Sheet 1
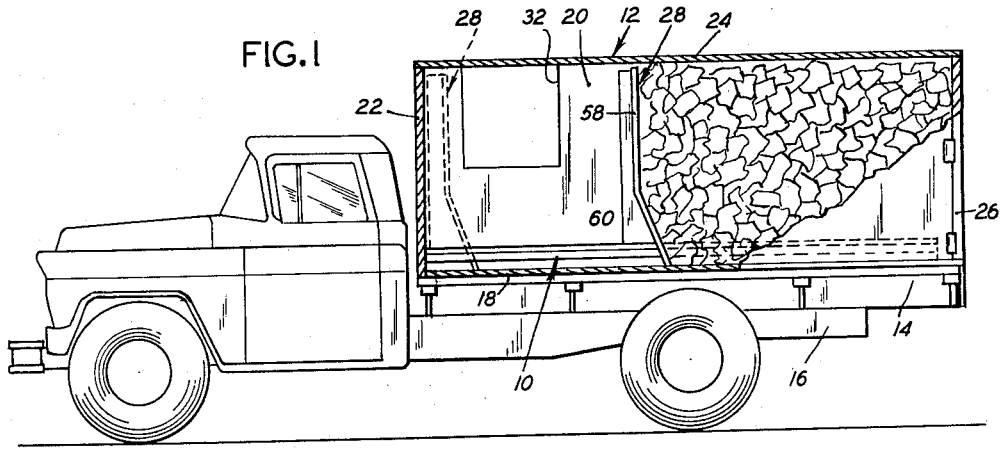
FIG.1
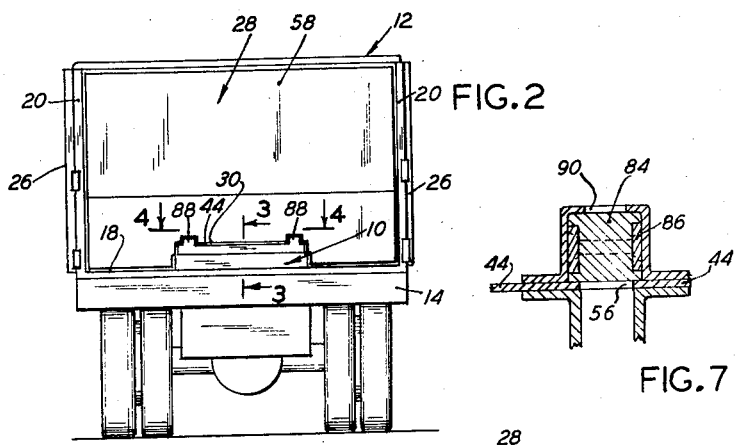
FIG.2
FIG.7
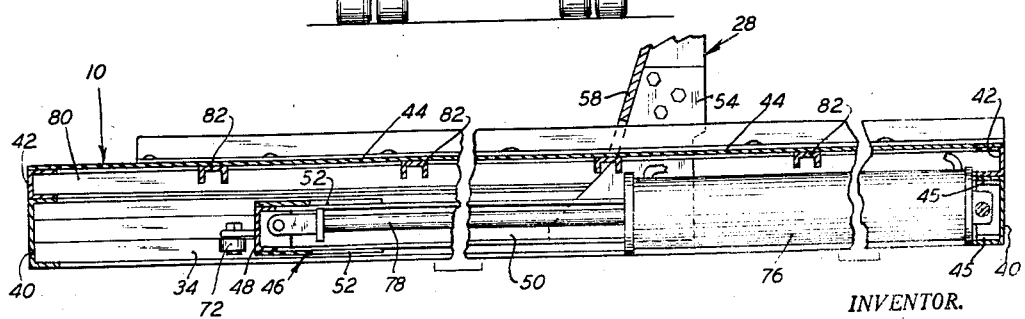
FIG.3
INVENTOR.
RICHARD A. KUHNAU
BY
BUCKHORN, CHEATHAM & BLORE
ATTORNEYS

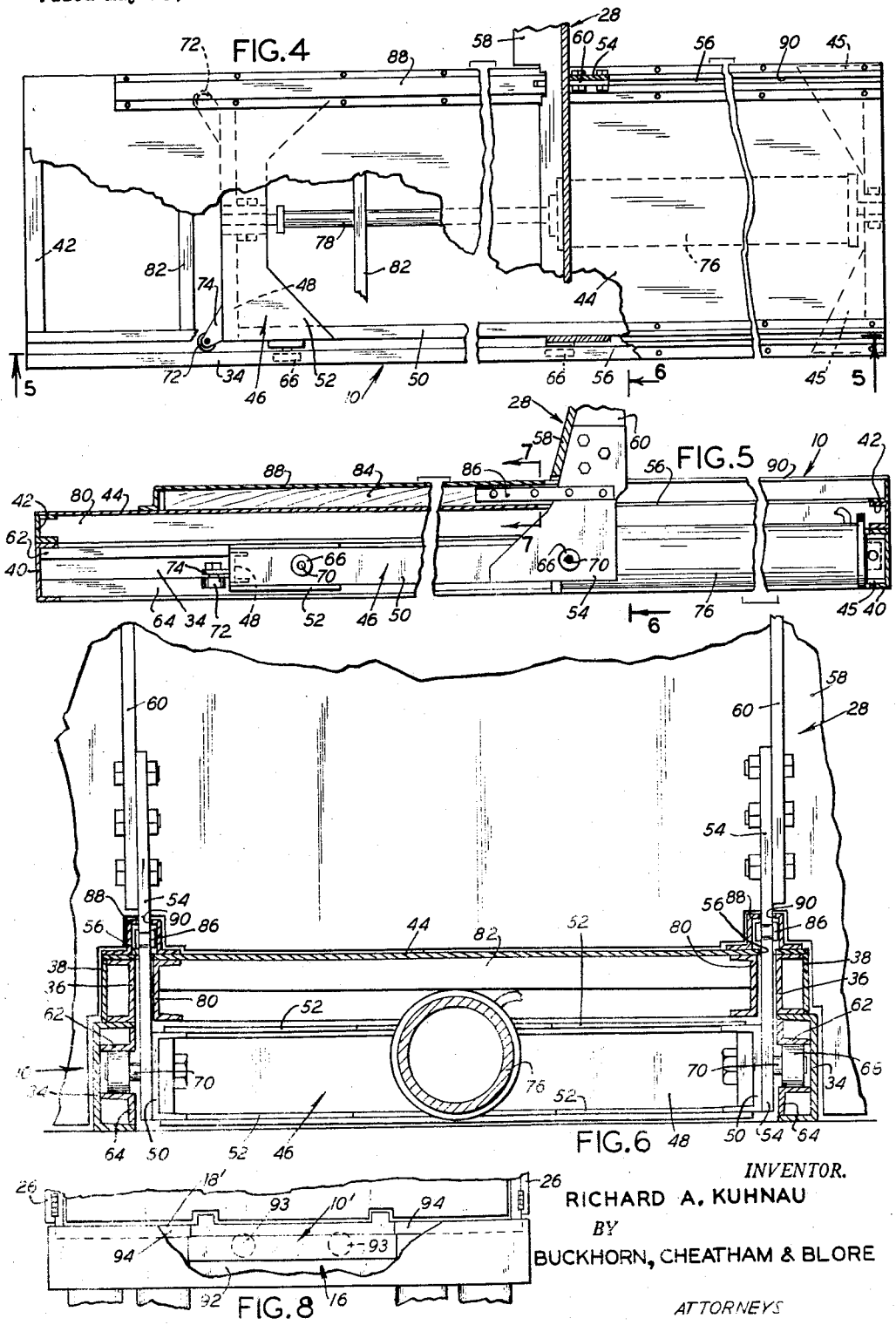

United States Patent Office 2,911,119
Patented Nov. 3, 1959

2,911,119

PACKER UNIT FOR TRUCKS

Richard A. Kuhnau, Portland, Oreg.

Application May 23, 1958, Serial No. 737,349

8 Claims. (Cl. 214—82)

This invention relates to a packer unit for trucks and more particularly to a unitary device which may be readily installed in many existing truck bodies, particularly those of the type conventionally employed for hauling refuse such as garbage or trash, with a minimum of modification of such bodies and which may also be easily built into new truck bodies so as to form the primary frame of such new bodies.

A large number of refuse truck bodies are now equipped with packer mechanisms. Such truck bodies provide an enclosure formed by a bottom wall or floor and a top wall as well as side walls and one end wall, and also have rear doors forming the other end wall of the enclosure. A plow or packer structure is mounted in the enclosure and may be forced longitudinally of the truck body to compress the load therein between the packer structure and the doors at the rear end of the truck. The truck body is in many cases of the dump type in which the front end of the body can be raised to dump the contents of the truck when the rear doors are opened. In loading the truck, the packer structure is moved to the front end of the truck body and a partial load is introduced into the truck through loading openings adjacent the front end of the body. The packer structure is then forced rearwardly to compress the load after which it is again moved forwardly so that additional load may be introduced into the body.

Various types of power means have been employed to move the packer structure, including screw members extending longitudinally of the truck body, chains positioned in slots in the walls or in the floor of the truck body, various cable arrangements and also hydraulic cylinders. In some cases a hydraulic cylinder has been located below the floor of the truck and various expedients for connecting the piston rod of the cylinder to the packer structure have been employed including cables trained over pulleys or members extending through slots in the floor. Such devices have, in general, required rather complete rebuilding of existing truck bodies or have required special designs of new truck bodies. Also, the power means and connections thereto have occupied excessive space or have been unduly complicated or have failed to properly seal the floor of the truck body if the packer structure has movable elements extending upwardly into the body through slots in the floor. Because of such deficiencies, a large number of refuse truck bodies of the general type above described are now in use which do not have packer mechanisms installed therein even though the weight of refuse which can be loaded into the body at one time is very much reduced.

In accordance with the present invention, a single unitary device is provided which may be installed in existing truck bodies of the general type above described without substantial modification thereof. The device of the present invention is installed on the floors of such bodies and has upstanding standards to which a packer structure may be secured. In general, the only special work required is to shape the peripheral edge of the packer structure to fit the interior of the truck body. The packer unit includes a unitary frame structure with a cover member thereover in which frame structure is housed a packer carriage and a power means for moving such carriage. The carriage has standards extending upwardly through slots in the top member of the unit and the packer structure is secured to such standards. Sealing members are provided for sealing such slots when they are exposed on the side of the packer structure which is in contact with the load in the truck body. The packer unit has high mechanical strength and relatively low friction losses and may be employed to exert as much packing force as the truck body can withstand.

While the packer unit of the present invention may be installed above the floor in existing truck bodies without substantial modification thereof, it is also possible to build the unit of the present invention into new truck bodies so that its upper surface is substantially flush with the floor of the truck body. In fact, the packer unit of the present invention may be employed as the primary frame structure of such new truck bodies. The upper portion of the frame of the unit may be extended laterally in which case the truck body may be fabricated upon the unit of the present invention and then placed in position upon a truck chassis. Thus a single type of packer unit or at least a relatively small number of similar types of packer units may be constructed in accordance with the present invention and supplied as unitary devices to fit substantially any refuse truck of the general type first described.

It is therefore an object of the present invention to provide a packer unit in the form of a unitary device which may be installed in existing refuse truck bodies without substantial modification thereof or which may be employed as the primary frame unit in new construction of refuse truck bodies.

Another object of the present invention is to provide a packer unit for installation in refuse trucks in which the packing mechanism as well as a power means therefor forms part of a single unitary device providing a seal for packing structure supporting members extending through slots in the top of such unit.

A further object of the invention is to provide an improved packer unit in the form of a unitary device for installation in existing truck bodies or in new truck bodies, in which unit a power means and a packer structure carriage are housed within the unit so as to support and operate a packer structure positioned above the unit.

A still further object of the invention is to provide a self-contained unit in which a packer structure is mounted on a reciprocable carriage with the packer structure above the top member of the packer unit and the carriage enclosed within such unit and in which a seal is provided for longitudinally extending slots in the top of such unit.

Other objects and advantages of the invention will appear in the following description of preferred embodiments shown in the attached drawing of which:

Fig. 1 is a side view of a refuse truck with a part of the body broken away to show the packer unit;

Fig. 2 is a rear view of the truck of Fig. 1 with the rear doors open showing the packer unit in position on the floor of the truck body;

Fig. 3 is a vertical longitudinal section through the packer unit of the present invention on an enlarged scale taken on the line 3—3 of Fig. 2 and showing in elevation a hydraulic cylinder forming the power means;

Fig. 4 is a plan view of the packer unit on the same scale as Fig. 3 looking in the direction of arrows 4—4 of Fig. 2 with parts broken away to show interior structure;

Fig. 5 is a vertical longitudinal section of the packer unit taken on the line 5—5 of Fig. 4;

Fig. 6 is a vertical transverse section of the packer unit of Fig. 5 on a further enlarged scale taken on the line 6—6 of Fig. 5;

Fig. 7 is a fragmentary vertical transverse section on a still further enlarged scale taken on the line 7—7 of Fig. 5 and showing details of the sealing structure; and Fig. 8 is a fragmentary elevation of the back end of a truck showing a modification in which the packer unit of the present invention constitutes the primary frame structure of the truck body and in which two hydraulic cylinders are employed as the power means instead of one.

Referring more particularly to the drawings, the packer unit 10 of the present invention is shown in position in a truck body 12 in Figs. 1 and 2. The truck body has a frame 14 mounted upon the frame 16 of the truck, the body frame 14 being secured to the truck frame 16 in any desired manner not shown. The truck body includes a bottom wall or floor member 18 supported by the body frame 14 and also includes side walls 20 and a front end wall 22 secured to the floor member 18. The truck body also includes a cover or top wall 24 secured to the side and end walls. The rear end of the truck body is closed by a pair of hinged doors 26 shown in closed position in Fig. 1 and in open position in Fig. 2.

The packer unit 10 includes a packer structure or plow 28 shown in its rearward or packing position in full lines and in its forward or retracted position in dotted lines in Fig. 1. The periphery of the packer structure 28 corresponds to the interior of the truck body 10 and it is notched at 30, as shown in Fig. 2, to fit the upper and side surfaces of the packer unit 10. At least one of the side walls 20 of the truck body is provided with a loading opening 32, as shown in Fig. 1. When the packer structure 28 is in its retracted position shown in dotted lines in Fig. 1, refuse is loaded into the truck body through the opening 32 and the packer structure 28 is then moved rearwardly to its packing position, shown in full lines, to compress the load in the truck body. It is then returned to its retracted position and additional refuse loaded into the truck and this operation is continued until the truck is fully loaded with a packed load of refuse.

The truck body 12 is preferably a conventional type of dump truck body. That is to say, it preferably has hydraulic or other power actuators (not shown) for raising the front end of the truck body about a pivot (also not shown) adjacent the rear end of the body so as to dump the contents of the truck when the doors 26 are open. Such dumping mechanism and pivotal mountings for dump truck bodies are conventional and will not be further described, since any known or suitable type of dumping mechanism may be employed.

As shown in Figs. 3 to 6 inclusive, the packer unit of the present invention includes longitudinally extending lower side frame members 34 of inwardly facing channel form and upper side frame members 36 of outwardly facing channel form and of smaller size than the lower frame members 34. The upper and lower side frame members are secured together with their inner portions flush with each other, for example, by welding and the channels of the upper side frame members 36 are preferably closed by reinforcing plate members 38. The packer unit also includes lower end frame members 40 of inwardly facing channel form secured to the lower side frame members 34 and also upper end frame members 42 of inwardly facing channel form secured to the ends of the upper side frame members 36 and also to the lower end frame members 40. The frame members 34, 36, 40 and 42 together provide a rigid rectangular frame and such frame is braced by a cover member 44 having its peripheral edges secured to the upper frame members 36 and 42 and further braced at the front end of the frame by reinforcing plates 45 shown in dotted lines in Fig. 4.

The cover member 44 and the frame members 34, 36, 40 and 42 form a housing for a packer carriage 46 supported for movement longitudinally of the frame, such carriage being positioned between the lower side frame members 34. The carriage includes an end cross element 48, preferably of channel form, at the rear of the carriage, which cross element has its ends secured to forwardly extending side elements 50, also preferably of channel form. The side elements 50 are braced with respect to the end element 48 by laterally extending reinforcing plates 52 positioned above and below the elements 48 and 50 and secured thereto, for example, by welding. The carriage has upwardly extending packer structure standards 54 secured to the side elements 50 adjacent their front ends, preferably by welding, and the upper ends of such standards 54 project upwardly through longitudinally extending slots 56 in the top or cover member 44. The plow or packer structure 28 has a load engaging plate 58 secured to laterally spaced upstanding reinforcing members 60 which in turn have their lower portions secured to the standards 54. The packer structure 28 thus serves to secure the front ends of the side elements 50 of the carriage 46 together so as to maintain them in proper laterally spaced position relative to each other.

The lower side frame members 34 of the frame of the unit have upper and lower angle irons 62 and 64 respectively, secured in their channel portions as most clearly shown in Fig. 6. The angle irons 62 and 64 are vertically spaced from each other and are welded in the channel members 34 so as to provide a channel shaped track having parallel horizontally extending upper and lower track surfaces for the carriage 46. The resulting tracks extend longitudinally of the side frame channel members 34 and receive therein front and rear rollers 66, respectively, on each side of the carriage. The rollers 66 are journaled on stub shafts 70 secured in the side elements 50 of the carriage 46 so as to project laterally outwardly therefrom. The rollers 66 are preferably standard antifriction bearings of the roller or ball type to provide for ease in reciprocating the carriage 46 in the frame of the packer unit. As shown most clearly in Figs. 4 and 5, a pair of lateral guide rollers 72, also preferably standard antifriction bearings, are also carried by the rear end of the carriage 46. Such rollers are journaled for rotation about vertically extending stub shafts secured in forwardly and laterally extending arms 74 on the carriage 46. The rollers 72 are positioned to bear against the inner vertically and longitudinally extending surfaces of the angle iron 64 forming the lower portion of the track for the rollers 66. The rollers 72 prevent the rear end of the carriage 46 from binding against the angle irons 62 and 64 when the carriage is reciprocated in a rearward direction during a packing operation.

The carriage 46 carrying the packer structure 28 is reciprocated between the retracted position of the packer structure 28, shown by dotted lines in Fig. 1, and the packing position, shown in full lines, by a hydraulic cylinder 76 having a piston rod 78. The hydraulic cylinder has its forward end pivotally connected to the center of the lower end frame member 40 at the front end of the frame and has the rear end of its piston rod 78 pivotally connected to the center of the end element 48 of the carriage 46. In Figs. 3 to 5, inclusive, the carriage is shown in its rearward or load packing position but it will be apparent that it may be reciprocated to a forward retracted position by the cylinder 76 acting through the piston rod 78. The cylinder 76 as well as the carriage 46 is thus located within the frame of the unit so as to be between the side frame members of the frame of the unit and be covered by the cover member 44. The cylinder 76 is also positioned between the side elements 50 of the carriage when the carriage is in its retracted position.

The plow or packer structure 28 is reciprocated for a portion only of the length of the truck body and the slots 56 through which the standards 54 extend upwardly through the cover member 44 are of sufficient length only to permit such reciprocation of the packer structure and its carriage 46. That is to say, the slots 56 in the cover member 44 run from the forward end of the packer unit to a position intermediate the ends of the packer unit. As shown most clearly in Fig. 6, the top member 44 is supported between the slots 56 by supplemental side frame members 80, preferably of channel formation, extending longitudinally of the frame of the unit. The supplemental side frame members 80 have their ends secured to the upper end frame members 42 of the unit and are positioned immediately adjacent the inner edges of the slots 56. It will be noted that the upper side frame members 36 are positioned immediately adjacent the outer edges of the slots 56. The slots 56 in the top member 44 thus continue downwardly between the side frame members 36 and the supplemental side frame members 80. To provide further supports for the top member 44, a plurality of top supporting cross members 82 extend between and have their ends secured to the supplemental side frame members 80. The top member 44 rests upon and is secured to the cross members 82 as well as the upper frame members 36, 42 and 80.

When the packer structure 28 is in its retracted position, a portion of the slot 56 in the top member 44 is exposed on the rear or load engaging side of the packer structure. In order to seal such exposed portion of slot 56, a rearwardly projecting sliding slot sealing member 84 (Figs. 5 and 7) is secured to each standard 54 by strap elements 86. The slot sealing members 84 are preferably rectangular or square in cross section, as shown in Fig. 7, and rest upon the upper surface of the cover member 44 in alignment with the slots 56. The slot sealing members 84 are each positioned in a housing 88 secured to the upper surface of the cover member 44 and having an interior conforming to the exterior surfaces of such slot sealing member. The housing 88 has a slot 90 in its upper surface for a portion of its length. The slot 90 is of the same length and is aligned with the slot 56 in the cover member 44 and each standard 54 for the packer structure 28 also extends upwardly through a slot 90.

When the packer structure is in its retracted position, the slot sealing members 84 are interposed between the slots 90 and slots 56 to prevent any portion of the load in the truck body from falling or leaking through the top member 44 into the interior of the packer unit. When the packer structure is in its rearward or load packing position, the slot sealing member 84 is housed in the portion of the housing 88 which is not slotted and rests upon an unslotted portion of the cover member 44. The preferred material for the sliding member 84 is lignum vitae, since such material is extremely hard, has good lubricating properties when either dry or wet, and does not swell if subjected to water from a load containing water, and also does not corrode. It will be noted from Figs. 2 and 6 that the lower edge of the packer plate 58 conforms to the upper surface of the packer unit 10 including the housings 88, and also conforms to the sides of the packer unit so that the load may be pushed rearwardly to compress the same without escape of any substantial portion of the load between the packer plate and the unit. The lower portion 92 of the packer plate 58, as best shown in Fig. 1, is preferably inclined downwardly and rearwardly to tend to lift the load upwardly from the floor 18 of the truck and from the upper surface of the packer unit 10.

As shown in Figs. 1 and 2, the packer unit of the present invention is adapted to be installed in existing truck bodies by merely securing the unit to the floor of the truck body and cutting the packer plate 58 of the packer structure 28 to conform to the sides and top of the refuse truck body. Although positioning the packer unit of the present invention above the floor of the truck is suitable for either new body construction or for installation of the unit in existing truck bodies, the unit of the present invention can be built into new truck bodies, as shown in Fig. 8, by positioning the upper surface of the unit 10' flush with the floor member 18' of the truck body. The unit 10' may then rest directly upon the frame 16 of the truck, the rear end member 92 of which is shown in Fig. 8. The upper portion of the frame of the unit 10' may then form the frame for the floor member 18' of the truck. That is to say, the frame of the unit 10' may have laterally extending upper frame members 94 secured thereto to support the truck body. The unit 10' thus becomes the primary frame component of the truck body. Also, instead of employing a single hydraulic cylinder 76 of relatively large size, a plurality of smaller cylinders, such as the two cylinders 94 indicated in dotted lines in Fig. 8, may be employed. The diameters of such cylinders are one of the limiting factors which determine the height of the frame of the unit 10' and by employing two or more cylinders, the vertical dimension of the frame of the unit may be correspondingly lessened so that the overall height of the truck is lowered or conversely more room is provided in the truck body for useful load for a given height of body.

The operation of the packet unit of Figs. 1 to 7 of the present invention should be apparent from the above description. When the packer structure 28 is in its forward or retracted position shown in dotted lines in Fig. 1, refuse is loaded into the truck body through the loading openings 32. When a substantial load has been accumulated in the truck body, the packer structure 28 is reciprocated rearwardly by the hydraulic cylinder 76. Such hydraulic cylinder 76 is connected between the front lower end frame member 40 of the frame of the unit and the rear cross member 48 of the carriage 46. By supplying hydraulic fluid under pressure to the front end of the cylinder 76 and exhausting fluid from the rear end thereof, the carriage 46 is forced rearwardly. Any known or suitable source of hydraulic fluid under pressure, such as the usual pump and hydraulic circuit present on dump trucks, may be employed for the cylinder 76 with suitable control valves as known in the art.

The carriage 46 is guided by the rollers 66 and 72 and the resulting movement of the carriage is imparted to the packer structure 28 through the columns 54 secured to the front ends of the side members of the carriage and extending upwardly through the cover member 44 of the unit through the slots 56 in such cover member and the aligned slots 90 in the housings 88 for the slot sealing members 84. When the packer structure 28 is in its retracted position, the slots 56 and 90 are sealed by the sliding slot sealing members 84. When the packer structure is in its load packing position, the slot sealing members 84 are positioned in the rearward unslotted ends of the housings 88. The packer structure 28 may be returned to its retracted position by the hydraulic cylinder 76 and an additional load placed in the truck body through the loading opening 32. The packing and loading operations are then repeated until a fully packed load is present in the truck body. Most packer trucks have provision for partially closing their loading opening, such as the loading opening 32, as the load approaches full load condition and such expedient may be employed with the present packer structure.

When a full load has been packed in the truck body, the truck is driven to an unloading location. The front end of the truck is elevated to unloading position by any conventional truck dumping mechanism (not shown). The doors 26 are opened either before or after the front of the truck body is raised to dumping position and the cylinder 76 is then employed to move the packer structure 28 to its rearward position to assist in causing the load to be discharged from the truck body. The operation of the modification shown in Fig. 8 is entirely similar to the operation just described.

While I have disclosed the preferred embodiments of my invention, it is understood that the details thereof may be varied and that the scope of the invention is to be determined by the following claims.

I claim:

1. A packer unit for refuse trucks comprising a unitary frame for mounting in a truck body, said frame having laterally spaced longitudinally extending side members secured together at their ends, said side members each providing a channel shaped track on its inner side extending longitudinally of said frame, a carriage positioned between said side members and having laterally spaced longitudinally extending side elements each having guiding portions engaging said track adjacent the ends of said side elements and providing for movement of said carriage longitudinally of said frame, said carriage having laterally spaced upwardly projecting standards each secured to one of said side elements, a top member covering said frame and said carriage and forming with said frame an enclosure for said carriage, said top member having its peripheral edges secured to said frame and providing laterally spaced longitudinally extending slots through which said standards project, a packer structure secured to and supported by said standards and having a lower edge conforming to the top of said unit, and power means positioned within said enclosure for moving said carriage to move said packer structure between a retracted position and a load packing position.

2. A packer unit for refuse trucks comprising a frame for mounting in a truck body, said frame having laterally spaced longitudinally extending side members and end members secured together to form a unitary structure, said side members each providing a channel shaped track on its inner side extending longitudinally of said frame, a carriage positioned between said side members and having laterally spaced longitudinally extending side elements each carrying rollers at its ends engaging said track for movement of said carriage longitudinally of said frame, said carriage having laterally spaced upwardly projecting standards each secured to one of said side elements, a top member covering and secured to said frame and forming with said frame an enclosure for said carriage, said top member having its peripheral edges secured to said frame and providing laterally spaced longitudinally extending slots through which said standards project, said frame having supplemental frame side members between said slots extending longitudinally of said frame adjacent said slots and secured to said end members for supporting said top member between said slots, a packer structure secured to and supported by said standards and having a lower edge conforming to the top of said unit, and power means positioned within said enclosure and connected to said end element for moving said carriage to move said packer structure between a retracted position and a load packing position.

3. A packer unit for refuse trucks comprising a frame for mounting in a truck body, said frame having laterally spaced longitudinally extending side members and end members secured together to form a rectangular unitary structure, said side members each providing a channel shaped track on its inner side extending longitudinally of said frame, a carriage positioned between said side members and having laterally spaced longitudinally extending side elements and each carrying rollers at its ends positioned in and engaging said track for movement of said carriage longitudinally of said frame, said carriage having laterally spaced upwardly projecting standards each secured to one of said side elements, a top member covering said frame and said carriage and forming with said frame an enclosure for said carriage, said top member having its peripheral edges secured to said frame and providing laterally spaced longitudinally extending slots through which said standards project, said frame having supplemental frame side members between said slots extending longitudinally of said frame adjacent said slots and secured to said end members for supporting said top between said slots, an end element within said enclosure securing said side elements together in laterally spaced relationship at one of their ends, a packer structure secured to and supported by said standards and having a lower edge conforming to the top of said unit, said packer structure maintaining the other ends of said side elements in laterally spaced relationship, power means positioned within said enclosure and connected to said end element for moving said carriage to move said packer structure between a retracted position and a load packing position.

4. A packer unit for refuse trucks comprising a frame for mounting in a truck body, said frame having laterally spaced longitudinally extending side frame members and end frame members secured together to form a unitary structure, said side members each having a channel shaped track on its inner side extending longitudinally of said frame, a carriage positioned between said side members and having laterally spaced longitudinally extending side elements, upwardly projecting standards each secured to one of said side elements, rollers at the front and rear of each of said side elements journaled for rotation about a horizontal axis extending laterally of said carriage, said rollers being received in said tracks for movement of said carriage longitudinally of said frame, a top member covering said frame and extending over said carriage and providing with said frame an enclosure for said carriage, said top member having its peripheral edges secured to said frame and providing longitudinally extending slots in alignment with said standards through which said standards project, said frame having supplemental side frame members extending longitudinally of said frame between and adjacent said slots and secured to said end members for supporting said top between said slots, a packer structure secured to and supported by said standards above said top member and having a lower edge conforming to the top of said unit, said packer member extending laterally and upwardly from said standards and conforming to the interior of said truck body, hydraulic power means secured to one end member of said frame and to the opposite end of said carriage and positioned in said enclosure between the side members of said frame for moving said carriage to move said packer structure between a retracted position and a load packing position.

5. A packer unit for refuse trucks comprising a unitary frame for mounting in a truck body, said frame having laterally spaced longitudinally extending side members each providing a channel shaped track on its inner side extending longitudinally of said frame, a carriage positioned between said side members, said carriage having laterally spaced longitudinally extending side elements and an end element securing one end of said side elements together, guide members on said carriage carried by each end of said side elements and engaging said tracks to provide for longitudinal movement of said carriage in said frame, said carriage having a standard secured to and extending upwardly from the other end of each of said side elements, a top member covering said frame and having its peripheral edges secured to said frame and providing longitudinally extending slots in alignment with said standards, a packer structure secured to and supported by said standards above said top member to secure said other ends of said side elements together, a hydraulic cylinder secured to one end of said frame and to said end element for moving said carriage to move said packer structure between a retracted position and a load packing position, said cylinder being positioned between said side frame members and being positioned between said side elements when said packer structure is in said retracted position.

6. A packer unit for refuse trucks comprising a frame for mounting in a truck body, said frame having laterally spaced longitudinally extending side members and end members secured together to form a unitary structure, said side members each providing a channel shaped track on its inner side extending longitudinally of said frame, a carriage positioned between said side members, said carriage having laterally spaced longitudinally extending side elements and an end element securing one end of each of said side elements together, rollers carried adjacent the ends of said side elements and extending into said tracks to provide for longitudinal movement of said carriage in said frame, said carriage having a standard projecting upwardly from the other end of each of said side elements, a top member covering said frame and providing with said frame an enclosure for said carriage, said top member having its peripheral edges secured to said frame and providing longitudinally extending slots in alignment with said standards, a packer structure secured to and supported by said standards above said top member to secure said other ends of said side elements together, a hydraulic cylinder secured to one end of said frame and to said end element for moving said carriage to move said packer structure between a retracted position and a load packing position, said cylinder being positioned in said enclosure between said side frame members and being positioned between said side elements when said packer structure is in said retracted position.

7. A packer unit for refuse trucks comprising a unitary frame for mounting in a truck body, said frame having laterally spaced longitudinally extending side members each providing a channel shaped track on its inner side extending longitudinally of said frame, a carriage positioned between said side members and having guiding portions at the front and rear thereof engaging said track for movement of said carriage longitudinally of said frame, said carriage having a laterally spaced upwardly projecting standard, a top member covering said frame and extending over said carriage and having its peripheral edges secured to said frame and providing longitudinally extending slots in alignment with said standards through which said standards project, a packer structure secured to and supported by said standards, power means positioned within said frame below said top for moving said carriage to move said packer structure between a retracted position and a load packing position, said slots each having a portion exposed to said load when said packer structure is in its retracted position, elongated sealing members secured to said standards and covering said portions of said slots when said packer structure is in said retracted position, said sealing members being of lignum vitae, an elongated casing positioned over and enclosing each of said sealing members and having a slot in its top for one of said standards, the last mentioned slots being aligned with the slots in said top member.

8. A packer unit for refuse trucks comprising a frame for mounting in a truck body, said frame having laterally spaced longitudinally extending side members and end members secured together to form a unitary rectangular frame structure, said side members each providing a channel shaped track on its inner side extending longitudinally of said frame, a carriage positioned between said side members and having rollers at its front and rear ends engaging said track for movement of said carriage longitudinally of said frame, said carriage having an upwardly projecting standard at each side thereof, a top member covering said frame and extending over said carriage to form with said frame an enclosure for said carriage, said top member having its peripheral edges secured to said frame and providing longitudinally extending slots in alignment with said standards through which said standards project, a packer structure secured to and supported by said standards, power means positioned within said frame below said top for moving said carriage to move said packer structure between a retracted position and a load packing position, said slots each having a portion exposed to said load when said packer structure is in its retracted position, elongated sliding members secured to said standards and covering said exposed portions of said slots when said packer structure is in said retracted position, and an elongated casing positioned over and enclosing each of said sliding members and having a slot in its top for one of said standards, the last mentioned slots being aligned with said slots in said top member.

References Cited in the file of this patent
UNITED STATES PATENTS

| | | |
|---|---|---|
| 2,480,527 | Wachter | Aug. 30, 1949 |
| 2,557,003 | Le Laurin | June 12, 1951 |
| 2,760,658 | Smith | Aug. 28, 1956 |